UNITED STATES PATENT OFFICE.

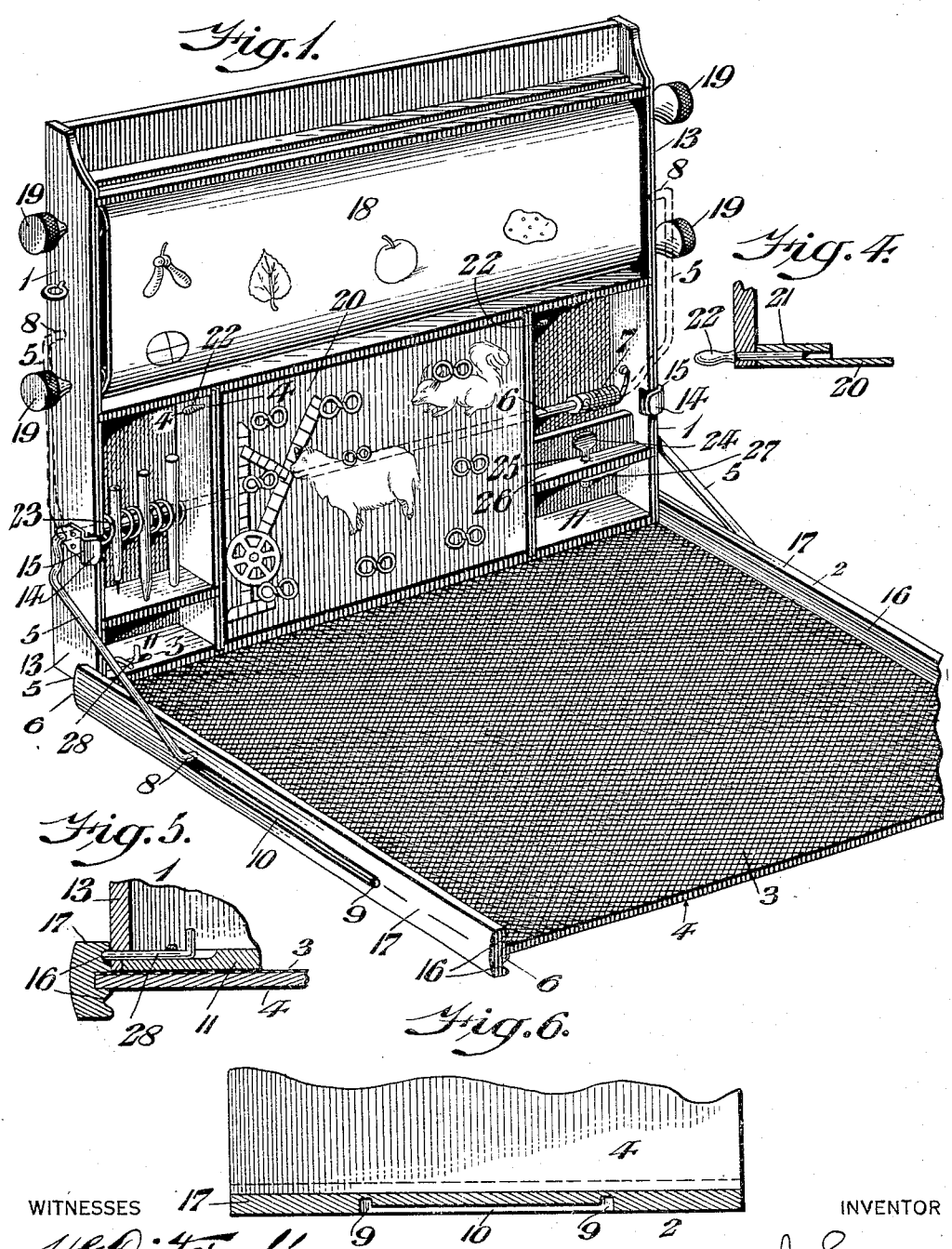

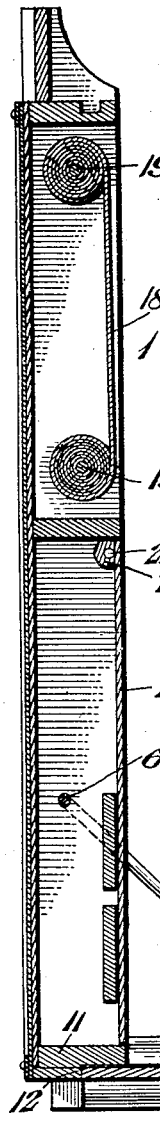

CLARENCE A. EVANS, OF CHESTER, PENNSYLVANIA.

EDUCATIONAL DEVICE.

1,305,449.  Specification of Letters Patent.  Patented June 3, 1919.

Application filed May 27, 1916. Serial No. 100,229.

*To all whom it may concern:*

Be it known that I, CLARENCE A. EVANS, a citizen of the United States, residing at Chester, in the county of Delaware, State of Pennsylvania, have invented a new and useful Educational Device, of which the following is a specification.

My invention consists of an educational device comprising a casing or desk-like member, and a shelf or lid-like member, the latter named member being two-faced, adapted to constitute on one side a black board, and on the other side a working board, it being made reversible to present either face for service, means being provided for sustaining the member in its various positions, provision being made for folding the sustaining means out of the way when the shelf or lid-like member is detached from the casing or desk-like member, provision being made also for sustaining a hinged placard removably on the casing or desk-like member and removing it therefrom, the device also embodying a sounding device, and other details as will be hereinafter set forth.

The device will be admirably adapted for object or educational teaching by means of pictorial representations, designs, art work, etc., and the employment of a black-board, a board for writing, drawing and delineating, kindergarten, vocational and illustrating purposes, and teaching phonetically and so training the ear.

The invention is satisfactorily illustrated in the accompanying drawing, but the important instrumentalities thereof may be varied, as long as they are included in the scope of the claims.

Figure 1 represents a perspective view of an educational device in operative condition embodying my invention.

Fig. 2 represents a central vertical section thereof.

Fig. 3 represents a side elevation of the device in closed condition.

Fig. 4 represents a horizontal section of a portion on line 4—4 Fig. 1, on an enlarged scale.

Fig. 5 represents a horizontal section of a portion on line 5—5 Fig. 1, on an enlarged scale.

Fig. 6 represents a longitudinal section of a portion on line 6—6 Fig. 1.

Fig. 7 represents a horizontal section of a portion on line 7—7 Fig. 3.

Fig. 8 represents a front elevation of a portion of the casing or desk showing a sounding device employed thereon.

Similar numerals of reference indicate corresponding parts in the figures. Referring to the drawings:

1 designates a casing comprising an upright desk which may be supported on a wall by means of eyes or other means on the sides of the frame of said casing, or placed on a table, desk, etc., if so desired.

2 designates a two-faced lid or shelf, one face of which may constitute a black board 3, and the other face 4 of which may be plain, constituting a member of a desk for scholars to write, draw, or otherwise work thereon, it being noticed that said lid or shelf 2 may be placed in horizontal working position, as shown in Fig. 1, and retained thereat by the crank arms 5 which are connected with the rotatable or rock shaft 6, the latter passing longitudinally through the casing 1 and being mounted on the vertical walls of said casing and engaged by a spring 7 which is connected with said shaft and an adjacent portion of the casing, said crank arms having on their outer terminals the inwardly projecting elbows 8 which are adapted to enter either of the deep seated recesses 9 as journals in the sides of the frame of the desk 1, said recesses being at the terminals of the longitudinally-extending slots 10 in said sides, it being seen that when the shelf or lid is in horizontal position, as in Fig. 1, the end portion of the same toward the desk or casing may be placed beneath the bottom wall 11 of the latter limited by the shoulder 12 on the lower ends of the side walls 13 of the desk or casing, said shelf or lid thus being sustained in horizontal position by the wall 11 and the crank arms 5.

It will be noticed also that the elbows 8 may be drawn out partly from the recesses 9 which they occupy when the lid or board 2 may be moved from under the wall 11, overturned and reversed, the board then sliding on said elbows in the slots 10 thereof, the board then being located horizontally as before, its rear portion abutting the underside of the wall 11 of the desk or casing, and the elbows springing into the adjacent recesses 9.

By these provisions either face of the board 2 may be placed above, and so made accessible for its respective use, and in either case, the board will be sustained in horizontal operative position.

It will be seen also that the lid or shelf may be placed in upright position turning on the elbows 8, as its journals, as shown in Fig. 3, closing against the front face of the casing or desk as a closure therefor, as shown in Fig. 3.

In order to retain the lid or shelf in its upright and closed position, there are secured to the side members of the frame of the casing or desk, the elastic clips 14 which are formed with noses 15 adapted to enter recesses 16 in the inner faces of the side members 17 of the lid or shelf 2.

The closing and opening motions of said lid or shelf are assisted by the action of the spring engaged shaft 6 which carries the arms 5, the latter having their elbow terminals adapted to enter either of the recesses 9, and the slot 10 intermediate of said recesses as has been stated.

It will be seen that the lid or shelf is removable from the casing or desk, in which case the elbows 8 are withdrawn from the recesses 9 and so the lid or shelf may be employed by itself independent of the casing or shelf to use either of its black-board or plain working faces 3 or 4, as desired.

The slots in the side members of the lid terminate substantially equi-distant from the ends of the side members so that when the free ends of the arms 5 are at one end of the slots, the lid will be supported in horizontal position, as seen in full lines in Fig. 1, and when they are in the opposite ends of the slots the lid is held in upright position to form a closure for the casing, as seen in Fig. 3.

When the lid or shelf is removed from the casing or desk, the crank arms 5 are controlled with the spring 7, whereby they turn upwardly and fold against a projecting member of the casing or desk 1, as shown in dotted lines, Fig. 1, so that said arms do not hang below the latter and interfere with the movement, or handling, or closing of the casing or desk.

The desk has compartments therein, in the upper one of which is the apron 18 which may be moved in opposite directions and wound on and unwound from rollers 19, said apron having thereon representations of objects to which the attention of the scholars may be directed.

In front of one of the other compartments is hinged the placard 20 with representations of objects held thereon for educational purposes, said placard being removable from the adjacent walls of said compartment, it being retained in place, in the present case, by means of eyes 21 on the placard, and pins 22 in said walls, passed into said eyes, it being evident that when the pins are drawn out, they are disconnected from the eyes, and from the walls, and so the placard may be displaced from the compartment, but the pins and eyes form a hinge for the placard admitting of the latter to be raised, thus uncovering the compartment which it occupies, admitting of access to books, materials, objects, etc., stored therein.

In another of the compartments is the coil 23 which is supported on the shaft 6, and provides a support for pencils, crayons, etc.

The casing or desk is provided with a suitable sounding device which in the present case is composed of the head 24 which is carried by the rod or shank 25, the latter being slidable in an opening in the wall 26 of the compartment which contains it and having connection with the spring 27 which is secured to said wall, it being evident that said head may be depressed to strike said wall to produce sounds for phonetic teaching and so training the ear.

In the frame of the casing or desk is fitted the bolt 28 whose outer end portion may be inserted in an opening in a side member of the lid or shelf to lock the latter in its open and horizontal position, sustained by the arms 5 and their terminal elbows, which latter occupy the respective recesses 9, said arms being carried by the spring actuated shaft 6, as has been stated. By these means while the lid is rotatably mounted on the elbows of said arms intermediate of the ends of the lid, and said bolt is engaged with the end portion of the lid adjacent to the casing, said lid is prevented from being thrown-up by the occupant of the desk striking said lid from below when the latter is in horizontal position, as shown in Fig. 1.

Having thus described my invention what I claim as new and desire to secure by Letters Patent, is:—

1. In an educational device, a casing, a reversibly mounted lid therefor, and movable means mounted on the casing and slidably engaged with the lid forming means for permitting reversal of the lid and to hold the latter in a horizontal or a vertical position, and means coöperable with the side members of the lid to lock the lid in its upright position.

2. In an educational device, a casing, a reversibly mounted lid therefor forming black and working boards, an arm on the side of said casing and having a terminal elbow, a rotatable shaft mounted in said casing adapted to carry said arm, the side of said lid having therein spaced-apart recesses in which the terminal elbow of said arm is freely received, and a slot in said side of said lid extending from one recess to the other, said elbow being slidable in said slot and devices on the casing engageable with the side members of the lid to hold the latter in its upright position.

3. In an educational device, a casing, a reversibly mounted lid therefor forming black and working boards, an arm on the side of said casing, a rotatable shaft mounted on the latter adapted to carry said arm, said lid having a slot adapted to freely and slidably receive a terminal member of said arm said slot terminating substantially equidistant from the ends of the side member of said lid and a spring-like member connected with said shaft and casing adapted to raise said arm automatically when said lid is removed and assist in drawing said lid toward said casing in closing the same to hold the lid in either vertical or horizontal position.

4. In an educational device, a casing, a lid having slots in its side members, means on the lower edge of the casing to coact with the inner edge of the lid, said lid being reversibly mounted, a shaft mounted on the casing, arms at right angles to said shaft having projections at their free ends freely slidable in said slots, and means on each lateral side of the lid at the terminals of the slots coacting with said projections to support the lid in horizontal or vertical position.

5. In an educational device, a casing, a lid having slots in its sides, the casing having a shoulder, and arms on the casing coacting with said shoulder and having their free ends engaged in said slots, said slots having their extremities equally distant from the ends of the side members of the lid so that when the free ends of the arms are at one end of the slots the lid will be supported in horizontal position and when they are in the opposite ends of the slots the lid is held in upright position to form a closure for the casing.

6. In an educational device, a casing, a reversibly mounted lid having slots in its sides, the casing having a shoulder, arms on the casing coacting with said shoulder and having their free ends engaged in said slots, said slots having their extremities equally distant from the ends of the side members of the lid, so that when the free ends of said arms are at either terminal of said slots, the lid may be supported in a horizontal or upright position without changing said ends of the arms from one end of said slots to the other, and means for raising said arms when the lid is removed.

7. In an educational device, a casing, a lid, an arm on said casing having an angular terminal, said lid having in its side a longitudinally-extending slot to receive the terminal of said arm, said slot having its extremities equi-distant from the ends of the side members of the lid to admit of the reversibility of said lid, and a bolt-like member on said casing adapted to engage said lid and assist in supporting the latter in horizontal position.

8. In an educational device, a casing, a lid having a slot in its side member terminating substantially equidistant from the ends of said side member, and an arm on the casing having an angular terminal freely slidable in said slot to admit of reversibility of the lid and holding of the same in vertical or horizontal position.

9. In an educational device, a casing, a reversible lid therefor, said lid having in its side a longitudinally extending slot, an arm mounted on said casing having on its side terminal an elbow which is adapted to slidably occupy said slot and support said lid in horizontal position while permitting of the rotation of the lid, and a bolt-like member mounted on said casing adapted to engage the end of said lid adjacent to said casing.

CLARENCE A. EVANS.

Witnesses:
JOHN A. WIEDERSHEIM,
N. BUSSINGER.

Copies of this patent may be obtained for five cents each, by addressing the "Commissioner of Patents, Washington, D. C."